United States Patent
Hu et al.

(10) Patent No.: US 9,352,388 B2
(45) Date of Patent: May 31, 2016

(54) INTEGRATION OF ONE PIECE DOOR INNER PANEL WITH IMPACT BEAM

(71) Applicant: GM GLOBAL TECHNOLOGY OPERATIONS LLC, Detroit, MI (US)

(72) Inventors: Bin Hu, Shanghai (CN); Jeff Wang, Jiangsu (CN); Xin Yang, Beijing (CN); Anil K. Sachdev, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 189 days.

(21) Appl. No.: 14/096,527

(22) Filed: Dec. 4, 2013

(65) Prior Publication Data

US 2015/0151359 A1 Jun. 4, 2015

(51) Int. Cl.
| | |
|---|---|
| B22D 17/22 | (2006.01) |
| B22C 9/08 | (2006.01) |
| B22D 19/02 | (2006.01) |
| B22D 19/00 | (2006.01) |
| B22D 21/00 | (2006.01) |
| B22D 25/02 | (2006.01) |
| B60J 5/04 | (2006.01) |

(52) U.S. Cl.
CPC . *B22D 19/02* (2013.01); *B22C 9/08* (2013.01); *B22D 17/22* (2013.01); *B22D 19/0081* (2013.01); *B22D 21/007* (2013.01); *B22D 25/02* (2013.01); *B60J 5/0455* (2013.01)

(58) Field of Classification Search
CPC ...... B22D 17/00; B60J 5/0455; B60J 5/0466; B60J 5/0483
USPC .......................................... 164/113, 303–318
See application file for complete search history.

(56) References Cited

U.S. PATENT DOCUMENTS

| | | | | |
|---|---|---|---|---|
| 7,686,066 B2 * | 3/2010 | Hirao | ...................... | B22D 17/22 |
| | | | | 164/113 |
| 7,810,549 B2 * | 10/2010 | Li | ........................... | B22D 17/04 |
| | | | | 164/113 |
| 8,317,253 B2 | 11/2012 | Sachdev | | |
| 8,454,078 B2 | 6/2013 | Sachdev | | |
| 2003/0189357 A1 * | 10/2003 | Patberg | .................. | B60J 5/0416 |
| | | | | 296/146.6 |

FOREIGN PATENT DOCUMENTS

| | | |
|---|---|---|
| CN | 202348040 U | 7/2013 |
| DE | 4237584 A1 * | 5/1994 |
| DE | 196 48 528 A1 | 5/1998 |
| JP | 8-282295 A | 10/1996 |
| JP | 2009-23473 A | 2/2009 |

OTHER PUBLICATIONS

EPO machine translation of DE 19648528, May 1998.*

* cited by examiner

*Primary Examiner* — Kevin E Yoon
(74) *Attorney, Agent, or Firm* — John A. Miller; Miller IP Group, PLC

(57) ABSTRACT

A method for manufacturing an inner door panel for a vehicle side door that employs a die casting process. The method includes providing a die cast mold having opposing mold halves that combine to define a die cavity configured to provide the inner door panel having an integrated impact beam. The mold cavity also includes channels that form a runner and gating system that causes the molten material to form an outer frame defining a central opening that allows the mold halves to be separated when the door panel has hardened within the mold.

13 Claims, 3 Drawing Sheets

INTEGRATION OF ONE PIECE DOOR INNER PANEL WITH IMPACT BEAM

BACKGROUND OF THE INVENTION

1. Field of the Invention

This invention relates generally to a method for manufacturing an inner door panel of a vehicle side door and, more particularly, to a method for manufacturing an inner door panel of a vehicle side door that includes die casting the inner door panel with an impact beam as a single integrated cast.

2. Discussion of the Related Art

Much engineering goes in to the design and manufacture of vehicle doors. A typical vehicle side door will include an outer door panel often formed of stamped steel, an inner door panel also formed of stamped steel and a trim panel. An impact beam is typically bolted or welded to the inner door panel so that it is between the inner door panel and the outer door panel for providing protection against side impact. Also, various reinforcement members are often welded to the inner door panel, such as a latch reinforcement member, a hinge reinforcement member and a waist reinforcement member. Once the reinforcement members and the impact beam are mounted to the inner door panel, the outer door panel is then secured to the inner door panel by folding over and joining an edge of the outer door panel to the inner door panel in a hemming process to provide a door in white. The inner trim panel is then mounted to the inside surface of the inner door panel. The various door hardware, such as window switches, motors, latch mechanisms, wiring, etc., are assembled at the appropriate time during the assembly process. Although the inner door panel, the outer door panel, the impact beam and the reinforcement members are typically made of steel, some or all of these components have been known to be made from other materials such as aluminum and polymers.

Die casting is a known metal forming process where a molten metal in a liquid state, such as aluminum or magnesium alloys, is poured or otherwise caused to flow within a die cavity defined by opposing die halves and cooled to be solidified therein to form the particular component. During the casting process, the die halves are clamped together and the molten metal is caused to flow through an orifice into the die under high pressure via a plunger through a shot-sleeve. Once the molten metal has solidified, the die is opened and the now hardened part is removed.

Die casting offers a number of advantages over stamping, forging and other metal forming processes including the ability to form highly complex or intricate part, simplified design and manufacturing and assembly processes, better quality, higher productivity due to a near net-shape process, etc. However, in order to allow a particular part to be die cast, it is necessary that the configuration of the part be such that all areas of the die cavity be filled with molten metal to form the part and allow the die halves to be separated without interference from the part.

SUMMARY OF THE INVENTION

In accordance with the teachings of the present invention, a method for manufacturing an inner door panel for a vehicle side door is disclosed that employs a die casting process. The method includes providing a die cast mold having opposing mold halves that combine to define a die cavity configured to provide the inner door panel including an integrated impact beam. The mold cavity also includes channels that form a runner and gating system that causes the molten material to form an outer frame defining a central opening that allows the mold halves to be separated when the door panel has hardened within the mold.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a technique for manufacturing an inner door panel of a vehicle side door with an integrated impact beam using a die casting process is merely exemplary in nature, and is in no way intended to limit the invention or its applications or uses.

The present invention proposes a die casting process for fabricating an inner door panel for a vehicle side door, where the inner door panel includes an integrated impact beam. As discussed above, a typical manufacturing process for a vehicle side door requires an assembly process for the inner door panel of several different door parts including welding various reinforcement members to the inner door panel, such as a latch reinforcement, a hinge reinforcement and a waist reinforcement, and bolting or welding an impact beam to the inner door panel. In the die casting process of the invention, all of those components are integrated into a single cast structure formed in a die casting mold. Those areas of the inner door that require reinforcement, which previously had been provided by the separate reinforcement members, can be made by providing a thicker section or a more robust area with embedded reinforced features in the die cast mold where more molten material is provided.

By employing a one-piece casting process for manufacturing the inner door panel, a reduction in design complexity, manufacturing cost and cycle time is provided. Further, the die casting process generates a lighter weight structure as compared to the stamped inner door panel and outer door panel assembly known in the art. Also, the manufacturing and assembly process for the vehicle door using the die casting process of the invention provides a reduction in cost as a result of a simplified design and manufacturing/assembly process, and a reduction in materials. Further, because the die casting process employs a single material to form the entire inner door panel structure, there are no issues with galvanic corrosion as a result of mixed materials.

Figure 1:
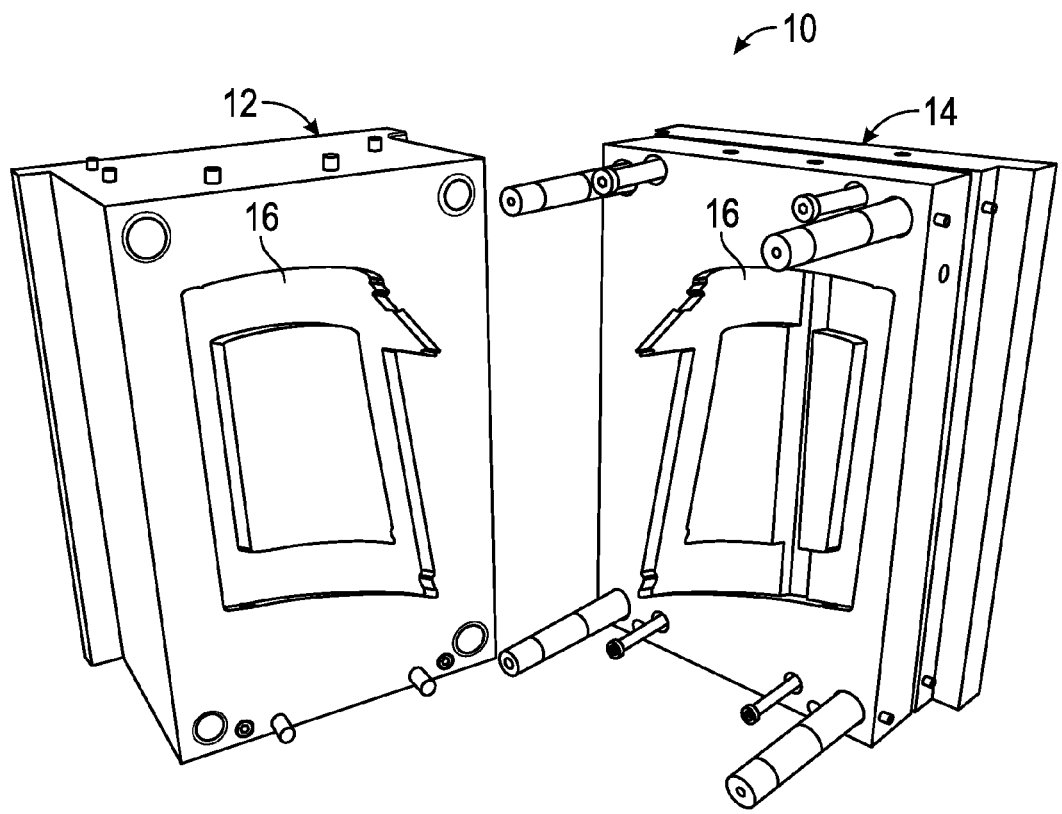
FIG. 1 is a simplified illustration of a die cast mold.

FIG. 1 is an isometric type view showing a simplified illustration of a die cast mold 10 including a first mold half 12 and a second mold half 14. The mold 10 includes an inner cavity 16 that is shaped to the particular component being manufactured, here an inner door panel for a vehicle side door, and provides the necessary runners and gates that allow the molten metal to easily flow to all areas in the cavity 16. An opening in the mold 10 when the mold halves 12 and 14 are clamped together allows access to the cavity 16 so that a molten metal from, for example, a shot-sleeve, can flow into the cavity 16. Although the metal can be any metal suitable for the purposes described herein, typically a die cast vehicle door panel will be aluminum or magnesium alloys. It is noted that the process for insuring that the molten material enters all of the open areas in the cavity 16 can be provided by suitable pressure and velocity. In the embodiments being discussed herein, the die cast process employs a vacuum-assist process to improve fluidity of the melt and hence reduce porosity in the finished part. Further, suitable cooling channels (not shown) can be provided within the mold 10 to reduce the temperature of any hot spots that may affect fabrication of the inner door panel as discussed herein.

Figure 2:
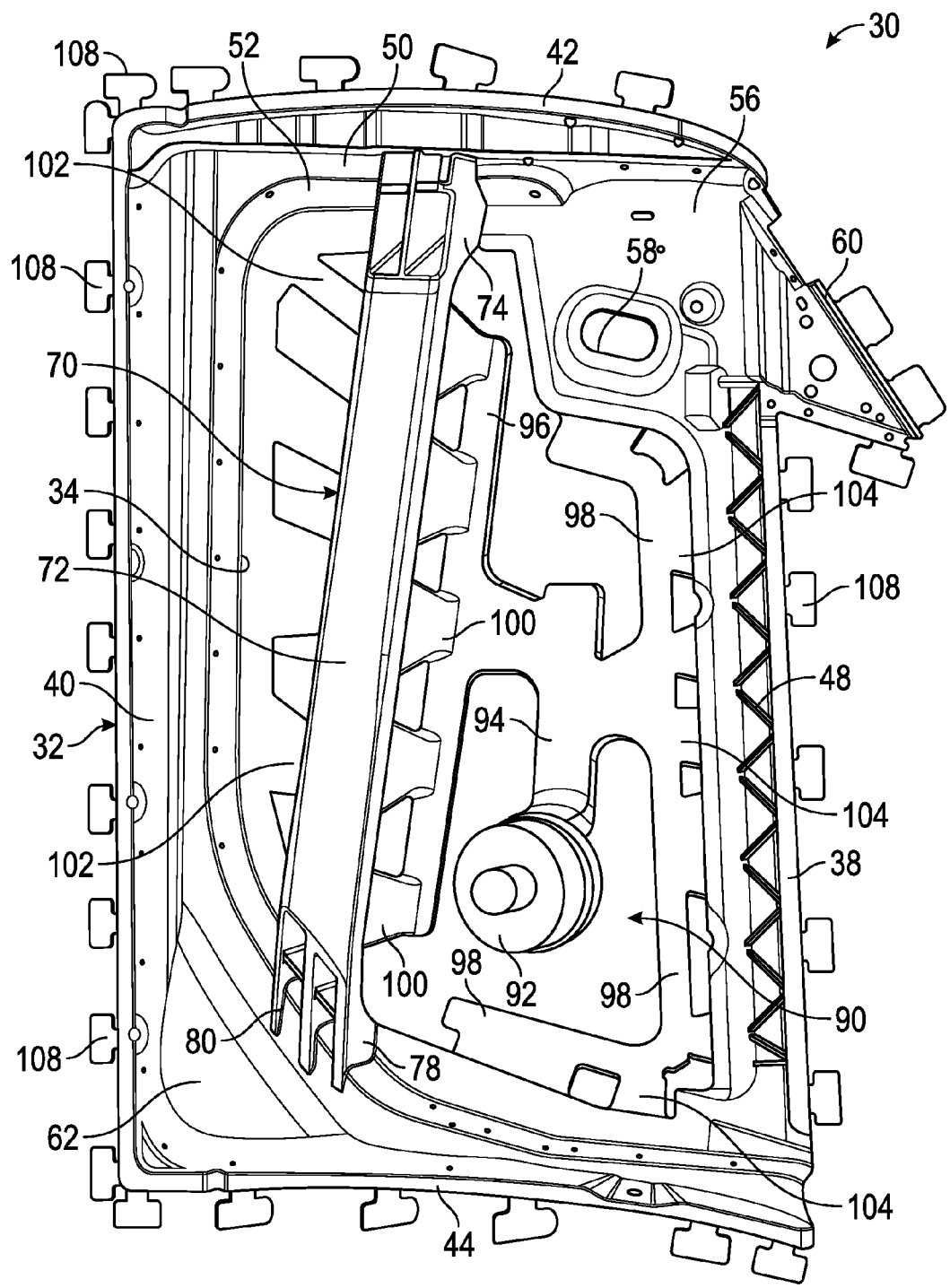
FIG. 2 is an isometric view of an inner door panel for a vehicle side door that has been die cast using the mold shown in FIG. 1 and includes an integrated impact beam and a gate runner and overflow system.
Figure 3:
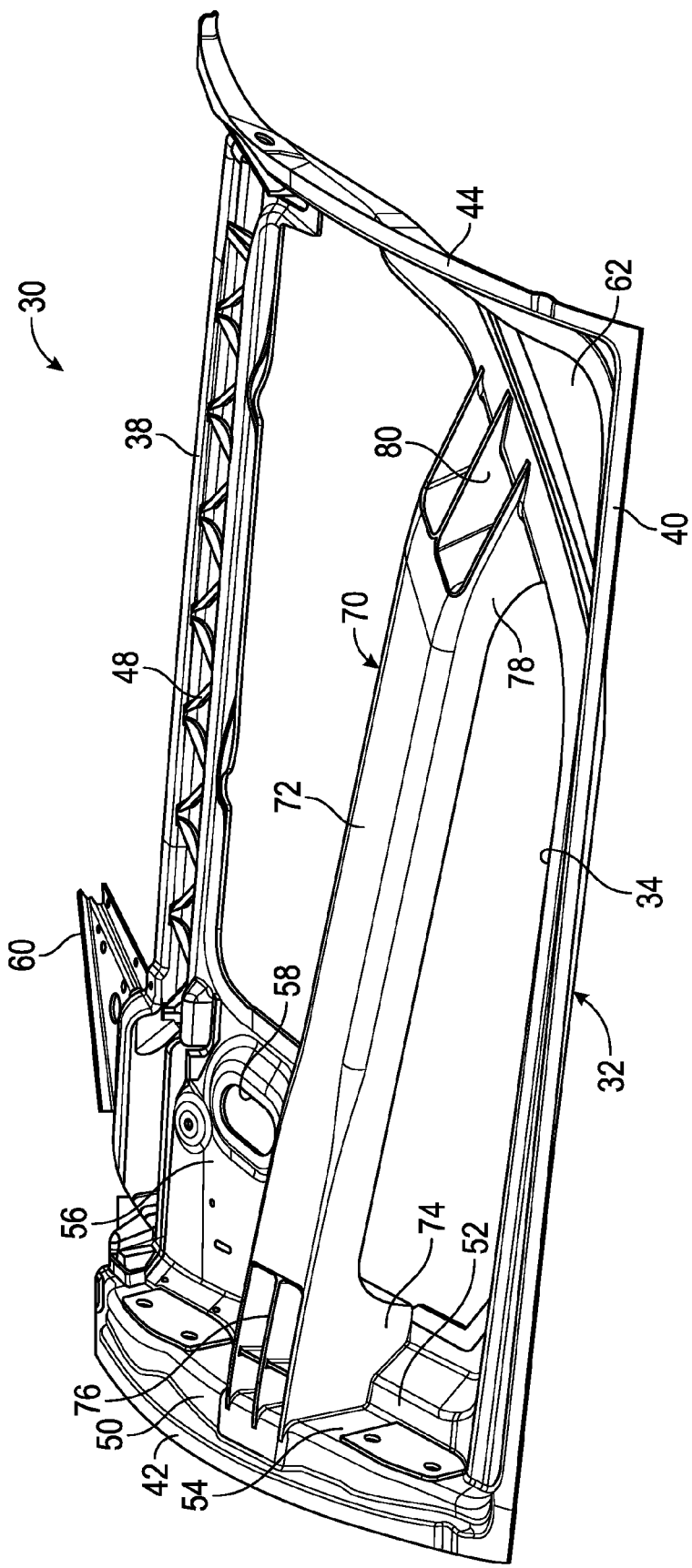
FIG. 3 is an isometric view of the inner door panel shown in FIG. 2 without the gate runner and overflow system.

FIG. 2 is an isometric view of an inner door panel 30 fabricated by a die casting process of the invention after it has been removed from the mold 10, but prior to when certain runners, gatings, overflow pieces, etc. have been removed by a suitable severing process, such as trimming, as would be well understood by those skilled in the art. FIG. 3 is an isometric view of the inner door panel 30 after the runners, gatings, overflow pieces, etc. have been removed showing the final door panel shape and design.

The inner door panel 30 includes an outer frame 32 that encircles the entire inner door panel 30 and defines a central opening 34 therein. The outer frame 32 includes a number of structural elements and parts that combine together and define the shape and configuration of the inner door panel 30 for a particular vehicle design to provide the desired structural integrity and weight. In this non-limiting design, the outer frame 32 includes a top rail 38, a bottom rail 40, an inner side rail 42 and an outer side rail 44. The top rail 38 includes a series of reinforcement ribs 48 extending along the top rail 38, for example, in a zig-zag configuration as shown. The inner side rail 42 includes a raised portion 50 and a lower portion 52 defining a vertical wall 54 therebetween. A planar portion 56 extends from the lower portion 52 and defines an opening 58 that is configured to accept a window motor or other door hardware. A side light support member 60 extends from the upper rail 38 proximate the planar portion 56. A support portion 62 is provided at the corner where the lower rail 40 and the outer side rail 44 meet.

The inner door panel 30 is die cast with an integral side impact beam 70, which provides reinforcement for side impacts to the vehicle. The side impact beam 70 includes a main beam 72 that extends across the opening 34. The impact beam 70 also includes a first support end 74 having a configuration that allows it to be integrally formed with the side rail 42 so that it is coupled to the vertical wall 54 and the lower portion 52 as shown. The support end 74 includes a series of spaced apart ribs 76 that provide the desired structural integrity with reduced material for reduced weight. A second support end 78 of the impact beam 70 is formed as part of the support portion 62 and also includes spaced apart ribs 80 that provide structural integrity in a light weight manner.

As is apparent, most of the outer frame 32 is along one plane and the side impact beam 70 is raised relative thereto to be positioned along a separate plane. Traditionally, such a configuration of a part would prevent the part from being made as a single piece unit in a die casting process. Particularly, because the die cast mold is formed from two halves where joining the halves defines the cavity in which the part is molded, attempting to die cast parts having components on separate planes with space therebetween presented issues of being able to separate the mold halves once the part had harden within the mold cavity. The present invention overcomes this limitation by providing the central opening 34 so that the location of the beam 70 is adjacent and relative to open space to allow portions of the mold halves 12 and 14 to contact each other where the opening 34 will be located to die cast the complete inner door panel 30.

When designing a die cast mold, it is often necessary to provide molten metal runners within the die cavity that optimize the filling and establish sequential solidification of the molten metal in all areas of the cavity 16. As such, the mold cavity 16 includes cavity portions and channels through which the molten metal flows and that form a runner and gating system 90 when the part has solidified that captures how the molten metal flows to the mold cavity portions that form the outer frame 32 and the impact beam 70, and also allows the mold halves 12 and 14 to be separated after the inner door panel 30 has solidified within the mold 10. The discussion below describes the runner and gating system 90 as being the structural elements that are part of the die cast part when the molten metal solidifies within the mold 10. It is noted however that the actual runner and gating system is the cavity portions within the cavity 16 that allows the molten metal to travel to those areas in the mold cavity 16 that form the inner door panel 30.

The gating system 90 includes a molten metal entry point 92 where the molten metal is introduced into the mold 10 that is connected to a main runner 94 which branches out to be connected to side runners 96 and 98. The side runner 96 connects to a plurality of downwardly extending vertical runners 100, here five, that form the impact beam 70. The gating system 90 also includes a plurality of runners 102, here four, that provide molten metal to the lower rail 40. The side runner 98 connects to a plurality of horizontal runners 104 that provide the molten metal to the top rail 38, the planar portion 56 and the outer side rail 44. All of the runners are carefully designed in size, orientation and configuration so that when the molten metal enters the entry point 92 it flows through the runners to provide a uniform filling pattern with low gas entrapment to form the inner door panel 30. A plurality of overflow channels in the mold cavity 16 extend around the cavity portions that define the outer frame 32 and allow front melt to flow therein and form overflow pieces 108, here twenty-six, which usually contain some products of oxidation and any excess lubricant that is wept away.

Once the inner door panel 30 is removed from the mold 10 as shown in FIG. 2, all of the formed runners are trimmed to define the final die cast inner door panel 30 as shown in FIG. 3. Thus, it will be apparent to those skilled in the art, that the two mold halves 12 and 14 can be clamped together so that the cavity 16 therein defines all of the structural elements shown in FIG. 2 and allows solid parts of the two mold halves 12 and 14 to contact each other at the open areas around and between the parts in the opening 34.

During the die casting process, steel bands or supports can be mounted in the cavity 16 for the impact beam 70 to increase its impact durability.

In an alternate cast-in-place embodiment, an impact beam is placed in the cavity 16 of the die cast mold 10 and the molten material is poured into the mold 10 so that it flows around the impact beam. A specially chosen coating could be applied on a surface of the pre-placed impact beam in order to control interface bonding and reactions between the molten metal and the impact beam.

Figure 4:
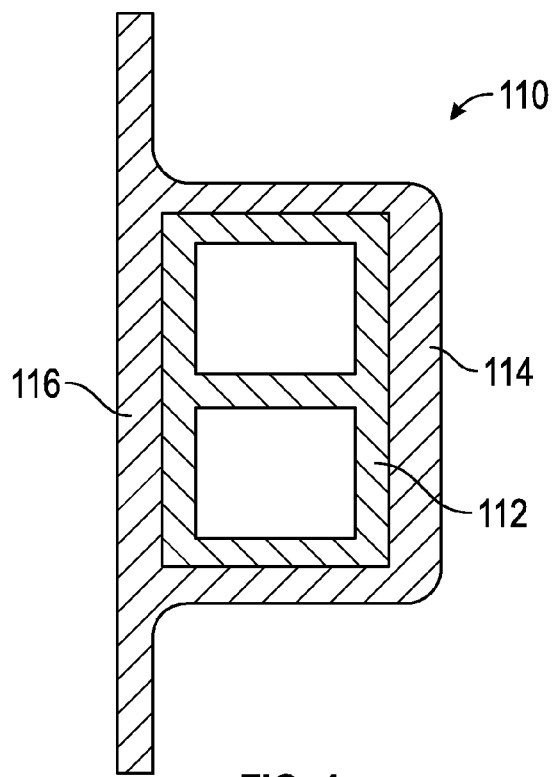
FIG. 4 is a simplified cross-sectional view of an inner door panel that has been die cast around a separate impact beam.

FIG. 4 is a cross-sectional view showing an inner door panel 110 after it has been die cast to illustrate this embodiment. In this embodiment, a more traditional shape for an inner door panel for a vehicle side door can be provided where the central opening 34 can be eliminated and metal can be provided across an entire plane of the door panel 110. By configuring the cavity 16 in the mold 10 to allow an impact beam 112 to be positioned therein the molten metal will flow around an outside surface of the impact beam 112 to form an extended panel portion 114 relative to a base panel portion 116 and the mold halves 12 and 14 can be readily separated without concern for open areas between the impact beam 122 and the plane of the inner door panel 120. Further, this allows the impact beam 122 to be made of a different material, such as extruded aluminum alloys, magnesium, and hot stamped steels, and the inner door panel can be made of another material, such as magnesium.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for die casting an inner door panel for a vehicle side door, said method comprising:
   providing a die cast mold including a first mold half and a second mold half each including a cavity that combine to provide a mold cavity, said mold cavity being configured to form the inner door panel and a runner and gating system;
   providing a molten metal to the mold cavity so that the molten metal flows into all areas of the mold cavity; and
   removing a solidified molded part including the inner door panel and the runner and gating system from the die cast mold, said inner door panel including an outer frame provided substantially along a first plane, said outer frame including a top rail, a bottom rail, an inner side rail and an outer side rail defining a central opening, said inner door panel further including an impact beam having a main beam portion, a first end support portion and a second end support portion, said first end support portion being formed to the inner side rail and the second end support portion being formed to the outer side rail where the main beam portion extends across the opening, said impact beam being provided substantially along a second plane separate from the first plane, and where the inner side rail includes an upper portion, a lower portion and a vertical wall coupled thereto, said first support end of the impact beam being configured to conform to the vertical wall and the lower portion.

2. The method according to claim 1 wherein the inner door panel includes a support portion provided at a location where the outer side rail and the bottom rail meet, said second support end of the impact beam being coupled to the support portion.

3. The method according to claim 1 wherein the top rail includes support ribs.

4. The method according to claim 1 wherein the first support end and the second support end of the impact beam include spaced apart support ribs.

5. The method according to claim 1 wherein the runner and gating system includes a main runner connected to first and second side runners where the first side runner is connected to vertical runners that form the top rail and the outer side rail and the second side runner is connected to vertical runners that form the impact beam.

6. The method according to claim 1 further comprising removing the gate and runner system from the molded part.

7. The method according to claim 1 wherein providing a molten metal to the mold cavity includes providing a molten aluminum alloy to the mold cavity.

8. The method according to claim 1 wherein providing a molten metal to the mold cavity includes providing a molten magnesium alloy to the mold cavity.

9. A method for die casting an inner door panel for a vehicle side door, said method comprising:
   providing a die cast mold including a first mold half and a second mold half each including a cavity that combine to provide a mold cavity, said mold cavity being configured to form the inner door panel and a runner and gating system;
   providing a molten metal to the mold cavity so that the molten metal flows into all areas of the mold cavity; and
   removing a solidified molded part including the inner door panel and the runner and gating system from the die cast mold, said inner door panel including an impact beam having a main beam portion, a first end support portion and a second end support portion, said inner door panel further including a central opening defined by an outer frame, said impact beam extending across the central opening, where the outer frame is provided substantially along a first plane which is separate and spaced apart from a second plane in which the impact beam is substantially provided, and where the inner side rail includes an upper portion, a lower portion and a vertical wall coupled thereto, said first support end of the impact beam being configured to conform to the vertical wall and the lower portion.

10. The method according to claim 9 wherein the first end support portion is formed as part of a first side rail of the outer frame and the second end support portion is formed as part of a second side rail of the outer frame.

11. The method according to claim 9 further comprising removing the gate and runner system from the molded part.

12. The method according to claim 9 wherein providing a molten metal to the mold cavity includes providing a molten aluminum alloy to the mold cavity.

13. The method according to claim 9 wherein providing a molten metal to the mold cavity includes providing a molten magnesium alloy to the mold cavity.

* * * * *